(No Model.)

J. A. HAMPTON.
HAY AND COTTON PRESS.

No. 273,520.  Patented Mar. 6, 1883.

WITNESSES:
Francis McArdle,
C. Sedgwick

INVENTOR:
J. A. Hampton
BY Munn & Co.
ATTORNEYS.

United States Patent Office.

JOHN A. HAMPTON, OF HOUSTON, TEXAS.

HAY AND COTTON PRESS.

SPECIFICATION forming part of Letters Patent No. 273,520, dated March 6, 1883.

Application filed December 5, 1882. (No model.)

*To all whom it may concern:*

Be it known that I, JOHN A. HAMPTON, of Houston, in the county of Harris and State of Texas, have invented a new and Improved Hay and Cotton Press, of which the following is a full, clear, and exact description.

The object of the invention is to improve a cotton or hay press, as hereinafter described, and pointed out in the claims.

Reference is to be had to the accompanying drawings, forming part of this specification, in which similar letters of reference indicate corresponding parts in all the figures.

Figure 1:
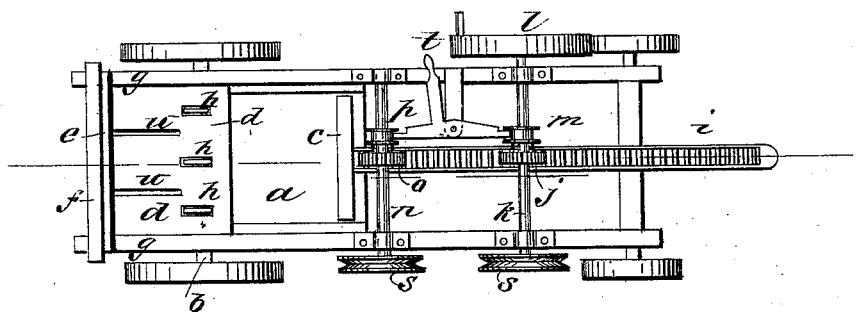
Figure 2:
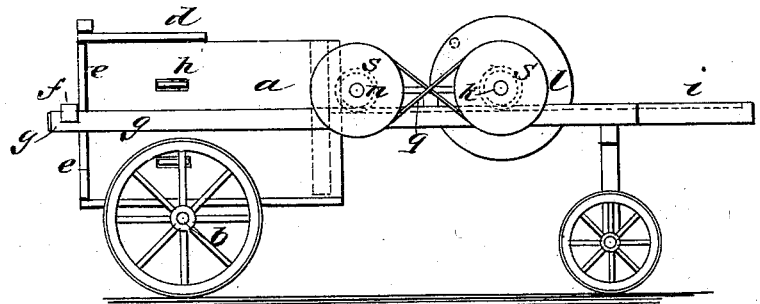
Figure 3:
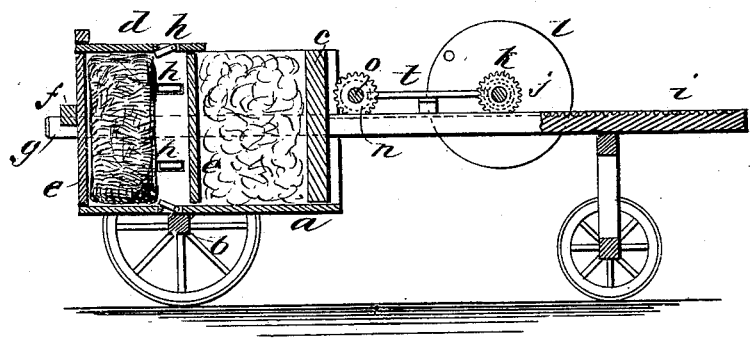

Figure 1 is a plan view of my improved press. Fig. 2 is a side elevation, and Fig. 3 is a longitudinal section.

The case $a$, which is mounted on the hind axle, $b$, of a truck and arranged for the follower $c$ to work forward and backward along it from the end fronting the fore end of the truck, has a cover, $d$, under which the substances are to be pressed against the removable head $e$, which is retained by the cross-bar $f$, notched in the ends of the side bars, $g$, of the frame and allowed to escape for the discharge of the pressed bale, when required, by taking out bar $f$. The top, sides, and bottom of the case are provided with retaining-pawls or ratchets $h$, which retain the pressed bale and allow the follower to be withdrawn, so that the case may be refilled while the pressed bale is being wired, through slots $u$ in which case I first put in a duplicate head, $e$, behind the pressed bale, to take the place of the one ahead of said bale when the latter is discharged, the said duplicate head being secured by replacing the bar $f$ as soon as the wired bale is discharged and before the duplicate head issues too far. The new charge thus displaces the pressed bale while being itself pressed, and thus economy of time and labor is effected.

To apply the power for working the follower in the direction for pressing the contents, it is provided with a toothed rack-bar, $i$, that gears by a pinion, $j$, with the shaft $k$ of a wheel, $l$, to which the power may be applied by hand or other means; and for reversing the motion of the follower without reversing the motion of the shaft the pinion $j$ connects with the shaft $k$ by a clutch, $m$, and another shaft, $n$, is geared with the rack by a pinion, $o$, also detachable by a clutch, $p$, and made to revolve in the reverse of the direction of shaft $k$ by a crossed belt, $q$, and pulleys $s$, and the clutches are connected to the reversing-lever $t$, to be shifted, as required, for the different operations. This reversing-gear is mainly designed for use when the machine is to be worked by power, for when it is worked by hand the said wheel may be turned alike to right or left.

I am aware that it is old to arrange a loose head in advance of the follower, so as to force the compressed bale out, and then serve as an abutment for the succeeding bale, also to move the follower by a rack and pinion, also to use spring-retainers to prevent the backward expansion of the article compressed after the follower has been retracted; but

What I claim as new and of my invention is—

1. An improved device for retaining a compressed bale in its condensed state after the follower is withdrawn, which consists of pawls $h$, pivoted in holes in the sides of the press-box and projecting toward the rear end of the press-box, as and for the purpose specified.

2. The combination, with the follower rack-bar $i$, the pinions $j$ $o$, the shafts $k$ $n$, having suitable pulleys adapted to be connected by belts, of two clutches, $m$ $p$, and a centrally-pivoted lever having the handle $t$, whereby the power may be reversed without changing the direction of the drive-shaft, as described.

JOHN ANDREW HAMPTON.

Witnesses:
J. C. M. POLAND,
E. W. TAYLOR.